US009905852B2

(12) United States Patent
Li et al.

(10) Patent No.: US 9,905,852 B2
(45) Date of Patent: Feb. 27, 2018

(54) SODIUM TRANSITION METAL OXIDE ELECTROACTIVE COMPOUNDS

(71) Applicant: Massachusetts Institute of Technology, Cambridge, MA (US)

(72) Inventors: Xin Li, Brookline, MA (US); Gerbrand Ceder, Wellesley, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 14/839,524

(22) Filed: Aug. 28, 2015

(65) Prior Publication Data

US 2016/0064734 A1    Mar. 3, 2016

Related U.S. Application Data

(60) Provisional application No. 62/043,522, filed on Aug. 29, 2014.

(51) Int. Cl.

| | | |
|---|---|---|
| *H01M 4/525* | (2010.01) | |
| *C01G 53/00* | (2006.01) | |
| *H01M 4/505* | (2010.01) | |
| *C01G 45/12* | (2006.01) | |
| *C01G 49/00* | (2006.01) | |
| *C01G 51/00* | (2006.01) | |
| *H01M 10/054* | (2010.01) | |
| *H01M 4/02* | (2006.01) | |

(52) U.S. Cl.
CPC ........ *H01M 4/525* (2013.01); *C01G 45/1221* (2013.01); *C01G 45/1228* (2013.01); *C01G 49/0027* (2013.01); *C01G 51/42* (2013.01); *C01G 53/42* (2013.01); *C01G 53/44* (2013.01); *C01G 53/50* (2013.01); *H01M 4/505* (2013.01); *C01P 2002/72* (2013.01); *C01P 2002/80* (2013.01); *C01P 2006/40* (2013.01); *H01M 10/054* (2013.01); *H01M 2004/028* (2013.01)

(58) Field of Classification Search
CPC .................................................. H01M 4/525
See application file for complete search history.

(56) References Cited

U.S. PATENT DOCUMENTS

2010/0323232 A1* 12/2010 Kuze .................. H01M 2/1653
429/144
2014/0065492 A1  3/2014 Komaba et al.

FOREIGN PATENT DOCUMENTS

EP    2239805 A1    10/2010
EP    2323204 A1    5/2011

OTHER PUBLICATIONS

International Search Report and Written Opinion for Application No. PCT/US2015/047370 mailed Nov. 24, 2015.
Hasa et al., High Performance Na 0.5 [Ni$_{0.23}$ Fe$_{0.13}$ Mn $_{0.63}$]O$_2$ Cathode for Sodium-Ion Battery. Advanced Energy Materials. 2014. 4: 1400083. 7 pages.
Kim et al., Layered NaNi$_{1/3}$ Fe$_{1/3}$ Mn $_{1/3}$ JO$_2$ cathodes for Na-ion battery application. Electrochemistry Communications. Feb. 13, 2012. 18: 66-9.
Li et al., O3-type Na (Mn$_{0.25}$ Fe$_{0.25}$Co$_{0.25}$Ni$_{0.25}$)O$_2$: A quaternary layered cathode compound for rechargeable Na ion batteries. Electrochemistry Communications. 2014. 49: 51-4.
PCT/US2015/047370, dated Nov. 24, 2015, International Search Report and Written Opinion.
International Preliminary Report on Patentability dated Mar. 9, 2017 for Application No. PCT/US2015/047370.
Vassilaras et al., Electrochemical properties of NaNi(1/3)Co(1/3)Fe(1/3)O(2) as a cathode material for Na-ion batteries. Electrochem Comm. 2014; 38:79-81.
Yoshida et al., NaFe(0.5)Co(0.5)O(2) as high energy and power positive electrode for Na-ion batteries. Electrochem Comm. Sep. 2013;34:60-3.

\* cited by examiner

*Primary Examiner* — Peter F Godenschwager
(74) *Attorney, Agent, or Firm* — Wolf, Greenfield & Sacks, P.C.

(57) ABSTRACT

Embodiments related to electroactive compounds, their methods of manufacture, and use are described. In one embodiment, an electroactive compound may include Na(Fe$_a$X$_{1-a}$)O$_2$. X includes at least one of Ti, V, Cr, Mn, Co, Ni, and a is greater than 0 and less than or equal to 0.4. In another embodiment, an electroactive compound may include Na(Mn$_w$Fe$_x$Co$_y$Ni$_z$)O$_2$, where w, x, y, and z are greater than 0. Further, a sum of w, x, y, and z is equal to 1 in some cases.

16 Claims, 13 Drawing Sheets

SODIUM TRANSITION METAL OXIDE ELECTROACTIVE COMPOUNDS

CROSS-REFERENCE TO RELATED APPLICATIONS

This application claims the benefit under 35 U.S.C. § 119(e) of U.S. provisional application Ser. No. 62/043,522, filed Aug. 29, 2014, the disclosure of which is incorporated by reference in its entirety.

FIELD

Disclosed embodiments are related to sodium transition metal oxide electroactive compounds.

BACKGROUND

Layered sodium metal oxides have attracted considerable interest as cathodes for Na-ion batteries partly due to the fact that seven layered O3-NaTMO$_2$ can be synthesized by simple solid state reactions and show the capability to intercalate Na ions reversibly, where TM is a single oxidized 3d transition metal ion selected from Ti, V, Cr, Mn, Fe, Co, Ni and O3 denotes the oxygen stacking. This is very different from their Li analogues, where only LiCoO$_2$ and LiNiO$_2$ reversibly intercalate Li ions.

SUMMARY

In one embodiment, an electroactive compound includes Na(Fe$_a$X$_{1-a}$)O$_2$. X includes at least one of Ti, V, Cr, Mn, Co, Ni, and a is greater than 0 and less than or equal to 0.4.

In another embodiment, an electroactive compound includes Na(Mn$_w$Fe$_x$Co$_y$Ni$_z$)O$_2$, where w, x, y, and z are greater than 0. Further, a sum of w, x, y, and z is equal to 1 in some cases.

In yet another embodiment, an electrochemical device includes an electrode including an electroactive compound comprising Na(Fe$_a$X$_{1-a}$)O$_2$. X includes at least one of Ti, V, Cr, Mn, Co, Ni, and a is greater than 0 and less than or equal to 0.4 in certain cases.

In another embodiment, an electrochemical device includes an electrode including an electroactive compound comprising Na(Mn$_w$Fe$_x$Co$_y$Ni$_z$)O$_2$, where w, x, y, and z are greater than 0. Further, a sum of w, x, y, and z is equal to 1 in some cases.

In yet another embodiment, a method of making an electrochemical material includes: mixing stoichiometric amounts of Na$_2$CO$_3$, Mn$_2$O$_3$, Fe$_2$O$_3$, Co$_3$O$_4$, and NiO; and sintering the mixture to form Na(Mn$_w$Fe$_x$Co$_y$Ni$_z$)O$_2$, where w, x, y, and z are greater than 0. Further, a sum of w, x, y, and z is equal to 1 in some cases.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1:
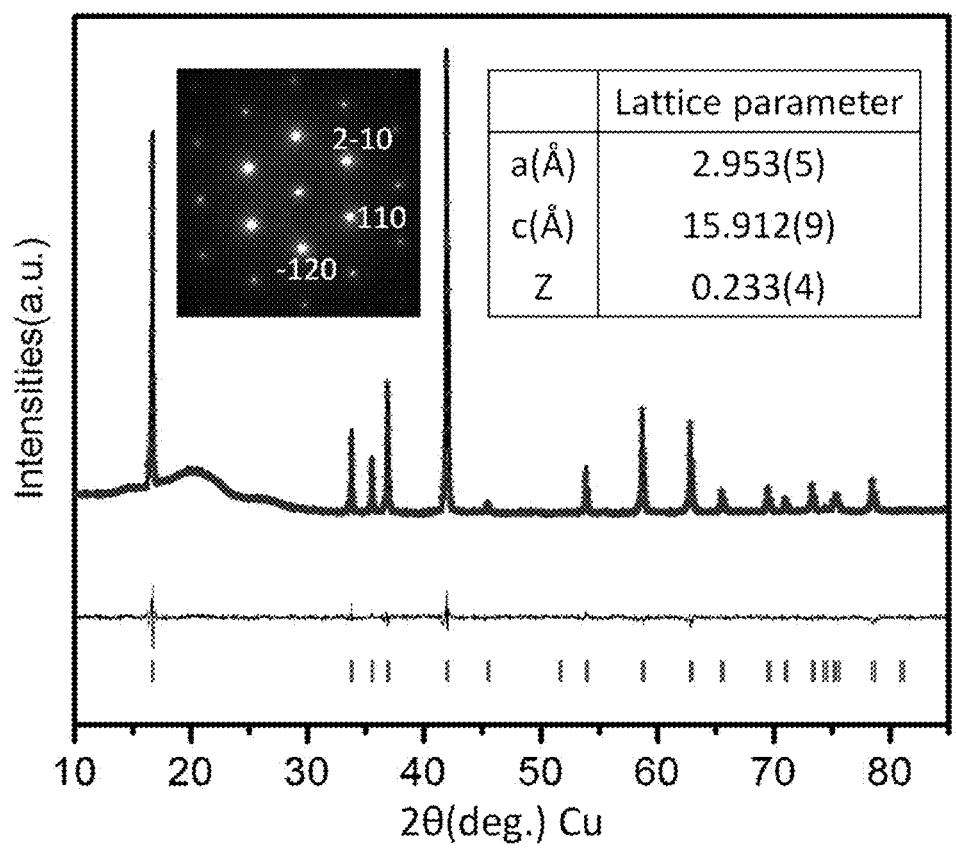
FIG. 1 is a graph of powder X-Ray diffraction refinement of O3-Na(Mn$_{0.25}$Fe$_{0.25}$Co$_{0.25}$Ni$_{0.25}$)O$_2$ using R-3m symmetry along with the corresponding electron diffraction pattern along the [003] zone axis, which is perpendicular to the ab transition metal plane.

Prior sodium transition metal oxide compounds (NaTMO$_2$) have exhibited acceptable amounts of cyclability or specific capacity, but not both. For example, O3-Na(Fe$_{0.5}$Co$_{0.5}$)O$_2$ (denoted hereafter as FC) shows a capacity around 160 mAh/g with excellent capacity retention when cycled below 4.0 V and an average voltage of 3.14 V. Further, O3-Na(Ni$_{0.5}$Mn$_{0.5}$)O$_2$ (denoted hereafter as NM) shows an initial discharge capacity of 185 mAh/g and an average voltage of 3.22 V, partly due to a long high voltage plateau around 4.0 V. However, capacity retention of NM is poor if the 4.0 V plateau is included in the galvanostatic cycling. Based on experiments included herein, it is believed that the Na diffusion barrier is too high for effective Na intercalation in many layered compounds of NaTMO$_2$ in the high voltage O3 phase, which has limited the capacity and/or cyclability of these compounds including the examples noted above. However, due to different transition metal ions easily mixing into the transition metal layer, it is believed that embedding a first transition metal into a surrounding second transition metal environment may lower the Na diffusion barrier. For example, in one embodiment, there may be unexpected benefits associated with controlling the iron content of NaTMO$_2$ compounds to provide compounds with an unexpected combination of specific capacity and cyclability not seen in NaTMO$_2$ compounds previously.

In one embodiment, an electroactive compound is a sodium transition metal oxide having the general formula Na(Fe$_a$X$_{1-a}$)O$_2$. In this formula, X may include at least one of Ti, V, Cr, Mn, Co, and Ni. Further, a may be greater than 0 and less than or equal to 0.4 in some cases. However, in some embodiments, a may be less than or equal to $\frac{1}{3}$. Correspondingly, depending on the embodiment, a may be greater than or equal to 0.2.

While X in the formula above may be any of the listed transition metals, in some embodiments, X includes at least one or more of Mn, Co, and Ni. Additionally, the relative proportions of the transition metals making up the portion of the compound corresponding to X, may be any appropriate ratio. However, in one embodiment, the transition metals corresponding to X may be present in equal portions. It should be realized that embodiments in which the transition metals are not present in equal portions are also contemplated.

In yet another embodiment, the electroactive compound is a sodium transition metal oxide having the general formula Na(Mn$_w$Fe$_x$Co$_y$Ni$_z$)O$_2$. In the above formula, w, x, y, and z are greater than 0. Further, w, x, y, and z may sum to 1. It should be understood that w, x, y, and z may correspond to any appropriate values depend on the particular embodiment. However, in one embodiment, x is between or equal to 0.1 to 0.5, between or equal to 0.2 to 0.4, and/or less than or equal to $\frac{1}{3}$. Further, in such an embodiment, each of x, y, and z may be between or equal to 0.1 and 0.7, 0.1 and 0.5, or any other appropriate range.

Without wishing to be bound by theory, as detailed in the examples below, it is believed that the concentration of Fe within a sodium transition metal oxide compound may be used to enhance the mobility of Na$^+$ ions within the compound. This may result in increased specific capacity and enhanced cyclability of the compound. This is believed to be due to Fe existing in the Jahn-Teller active state Fe$^{4+}$ when the compound is in the oxidized. Due to high spin Fe$^{4+}$ being Jahn-Teller active, it provides structural flexibility to the compounds such that the crystal lattice deforms and buckles up when a Na$^+$ ion passes through the tetrahedral site, thus lowering the Na diffusion barrier. However, when more than about $\frac{1}{3}$ of the transition metal content is Fe, the Fe atoms begin to touch each other to from Fe clusters which may result in Fe migration due to the "dynamic Na$_{tet}$—Fe$_{tet}$ dumbbell" mechanism for Fe migration. The Fe migration reduces the amount of Jahn-Teller active Fe$^{4+}$ available to aid the mobility of sodium ions within the compound, and may also block the Na diffusion pathways. To avoid Fe migration, Fe may make up less than or equal to $\frac{1}{3}$ of the transition metal content present in the electroactive compound. However, embodiments in which Fe is present in a proportion greater than $\frac{1}{3}$ of the transition metal content are also contemplated, as the disclosure is not so limited.

In view of the above, a sodium transition metal oxide compound may include Fe within a range of different concentrations. For example, in one embodiment, Fe may account for greater than 0%, greater than or equal to 10%, greater than or equal to 20%, greater than or equal to 30%, or any other appropriate percentage of the transition metal content of a sodium transition metal oxide compound. Correspondingly, Fe may account for less than or equal to 50%, less than or equal to 40%, less than or equal to 33% (i.e. $\frac{1}{3}$), less than or equal to 20%, or any other appropriate percentage of the transition metal content of a sodium transition metal oxide compound. Combinations of the above Fe content ranges are contemplated including, for example, the Fe percentage of the transition metal content may be greater than 0% and less than or equal to 50%, between or equal to 20% and 40%, between or equal to 20% and 33%, or any other appropriate portion of the transition metal content of a sodium transition metal oxide. While several specific ranges are given above, other combinations are also contemplated.

In one set of embodiments, a sodium transition metal oxide compound has an initial specific discharge capacity greater than or equal to 160 mA h/g, 170 mA h/g, 180 mA h/g, 190 mA h/g, or any other appropriate initial specific discharge capacity as measured at a discharge rate of C/10. Similarly, the compound may have an initial specific discharge capacity less than or equal to about 200 mA h/g, 190 mA h/g, 190 mA h/g, or any other appropriate initial specific discharge capacity as measured at a discharge rate of C/10. Combinations of the above ranges may be used including, for example, an initial specific discharge capacity of the compound may be between or equal to 170 mA h/g and 200 mA h/g though other combinations of the above ranges are also contemplated. The specific discharge capacities may be measured, for example, by using the relevant compound as a positive electrode in an electrochemical cell against a Na anode, charging the compound to a maximum of 4.3 V (relative to the potential of Na$^+$/Na, i.e., relative to the potential of Na$^+$ in Na metal, e.g., in a Na metal anode), then discharging the compound to 1.9 V at a rate of at least about C/10. It should be understood that compounds having specific discharge capacities both greater than and less than those noted above are contemplated.

In a related set of embodiments, a sodium transition metal oxide compound has a specific energy density greater than or equal to 500 Wh/kg, 550 Wh/kg, 600 Wh/kg, or any other appropriate specific energy density as measured at a discharge rate of C/10. Similarly, the compound may have a specific energy density less than or equal to about 650 Wh/kg, 600 Wh/kg, 550 Wh/kg, or any other appropriate specific energy density as measured at a discharge rate of C/10. Combinations of the above ranges may be used including, for example, a specific energy density of the compound may be between or equal to 500 Wh/kg and 650

Wh/kg though other combinations of the above ranges are also contemplated. Such specific capacities may be measured, for example, by using the relevant compound as a positive electrode in an electrochemical cell against a Na anode, charging the compound to a maximum of 4.3 V (relative to the potential of $Na^+/Na$, i.e., relative to the potential of $Na^+$ in Na metal, e.g., in a Na metal anode), then discharging the compound to 1.9 V at a rate of at least about C/10. It should be understood that compounds having specific energy densities both greater than and less than those noted above are contemplated.

In certain embodiments, various compositions as discussed herein can be selected and/or optimized, e.g., for use in batteries and/or other electrochemical devices based on screening tests, for example, based on charging or cycling profiles. For instance, a composition may be formed into a cathode in an electrochemical cell and charged against a sodium anode. By exposing the compound to various voltages (e.g., 4.3 V, 4.2 V, 4.0 V, 3.9 V, etc. relative to the potential of $Na^+/Na$), then discharging the compound to a lower bound voltage (e.g. 2.0 V, 1.9 V, etc.) at a rate of at least about 16 mA/g (approximately a C/10 rate), though other charge/discharge rates might be used, the performance of various compositions can be ascertained, and used to select or optimize compositions for use in a particular battery and/or other electrochemical device. As another example, the compound may be repeatedly charged and discharged as described above, with better or more optimized compounds yielding better cyclability, i.e. better performance after repeated charge/discharge cycles.

The electroactive compounds as discussed herein, in some embodiments, are solid, and in some cases, crystalline. For example, the cations and anions disclosed herein forming the compound may be arranged in a repeating array having a definite crystal structure, i.e., defining a unit cell atomic arrangement that is repeated to form the crystal structure. In some embodiments, the crystal structure is a hexagonal crystal system. In a hexagonal crystal system, the unit cell atomic arrangement can be described by three vectors to of which have the same length and the third vector is of unequal length. The vectors form a parallelogram prism. Here, the two vectors of equal length are oriented at an angle of 120° relative to each other, while the third vector is perpendicular to the other two vectors.

Depending on the particular charge state, an electroactive compound as described herein may exhibit different types of oxygen stacking that evolves with changes in the charge state of the material. For example, the electroactive compound may exhibit one or more of the following phases for corresponding amounts of sodium intercalation: O3, O3', O3", P3, or any other appropriate phase. Without wishing to be bound by theory, the "O" label designates an octahedral oxygen coordination around Na, where as "P" designates a prismatic coordination of Na by oxygen, according to the notation of Delmas. The number "n" as in On or Pn denotes the number of layers needed to repeat the unit cell in the direction perpendicular to the layers. The prime following On or Pn denotes the existence of different degrees of monoclinic distortions in the crystal structure caused by either the Na vacancy orderings or Jahn-Teller distortion of the transition metal ions. The distortion lowers the original Rhombohedral symmetry of the crystal to Monoclinic.

Other crystal structures and/or crystal structure distortions may also be present in the compound. For example, the presently described compounds may exhibit a reduced monoclinic distortion of the crystal structure during Na de-intercalation as compared to other sodium transition metal oxides where multiple phase transitions between hexagonal and monoclinic phases are typically observed. Further, in some embodiments, the described compounds may not exhibit any monoclinic distortion of the crystal structure during Na de-intercalation. Without wishing to be bound by theory, reducing the phase distortions and phase transitions during the charge discharge cycle may result in increased cyclability of the presently described electroactive compounds. In view of the above, at least about 99% (by weight) of a sample of the compound may exhibit the hexagonal crystal system, while the other 1% of the compound may exhibit other crystal systems including, for example, a monoclinic crystal system. In some cases, at least about 95%, at least about 90%, at least about 80%, at least about 70%, at least about 60%, at least about 50%, at least about 40%, at least about 30%, or at least about 20% of the compound may exhibit the hexagonal crystal system. The presence of crystal systems such as these may be determined using any suitable technique known to those of ordinary skill in the art, for example, by determining the specific capacity of an electrochemical device containing the compound, using XRD/Rietveld refinement techniques, or the like, as discussed herein.

In some cases, other ions may also be present within a crystal structure (e.g., as substituents or impurities), although such ions may not, in some embodiments, substantially alter the crystal structure of the compound. For instance, ions such as lithium, potassium, strontium, barium, aluminum, magnesium, calcium, bismuth, tin, antimony, or other transition metals such as scandium, copper, zinc, yttrium, zirconium, niobium, molybdenum, tungsten, etc. may be found in the crystal structure.

Compounds such as these described herein may be prepared in any number of ways. However, in one embodiment, the disclosed compounds may be made by combining one or more suitable precursors together, and firing or heating the precursors together, removing undesirable components or elements, to produce the final compound. In some cases, the precursors may be combined together in suitable stoichiometric ratios such that the final compound formed is stoichiometrically balanced.

As non-limiting examples of precursors, a precursor of sodium may be sodium metal and/or sodium carbonate ($Na_2CO_3$), sodium peroxide ($Na_2O_2$), and/or sodium oxide ($Na_2O$). A precursor of iron may be a metallic iron and/or other compounds comprising iron, for example, iron (II) carbonate ($FeCO_3$), iron acetate ($Fe(CH_3COO)_2$), iron(III) oxide ($Fe_2O_3$). A precursor of manganese may be metallic manganese and/or other compounds comprising manganese, for instance, manganese carbonate ($MnCO_3$) or manganese oxalate dihydrate ($MnC_2O_4.H_2O$), manganese(III) oxide ($Mn_2O_3$). A precursor of cobalt may be metallic cobalt and/or other compounds comprising cobalt, for instance, cobalt carbonate ($MnCO_3$) or cobalt(II,III) oxide ($Co_3O_4$). A precursor of vanadium may be metallic vanadium and/or other compounds comprising vanadium, for instance, vanadium carbonate ($VCO_3$) or vanadium (III) oxide ($V_2O_3$). A precursor of titanium may be metallic titanium and/or other compounds comprising titanium, for instance, titanium carbonate ($TiCO_3$) or titanium(III) oxide ($Ti_2O_3$). A precursor of chromium may be metallic chromium and/or other compounds comprising chromium, for instance, chromium carbonate ($CrCO_3$) or chromium(III) oxide ($Cr_2O_3$). A precursor of nickel may be metallic nickel and/or other compounds comprising nickel, for instance, nickel carbonate ($NiCO_3$), nickel (III) oxide ($Ni_2O_3$), nickel(II) oxide (NiO). In some cases, a precursor may be a precursor of more than one of Na, Fe, Mn, Co, V, Ti, Cr, and/or Ni. The above precursors may also be used as precursors for oxygen as well. Combinations of any of these and/or other precursors may also be used in certain cases. In some embodiments, the precursors may be mixed prior to sintering, for example, by grinding, milling (e.g., ball milling), or the like. While several types of precursors have been listed above, it should be understood that other types of precursors may also be used, as the disclosure is not so limited.

After being appropriately mixed, the above noted, or other appropriate precursors, may be sintered together to produce the electroactive compounds discussed herein. If the precursors are present in non-stoichiometric ratios (e.g., there is a deficiency or excess of one or more of the elements, e.g. there is excess Na), particles having non-stoichiometric overall compositions similar to those described above may form. Alternatively, if the composition is far enough from the stoichiometric composition, a separate phase in addition to the desired phases described herein may be formed. When sintering the precursors, the sintering temperature may be less than a melting temperature of the resulting material, less than a melting temperature of one or more of the precursors, and/or above a decomposition temperature of a compound including carbon, hydrogen, or other element not present in the final resulting electroactive compound, e.g. a carbonate compound. In one embodiment, sintering may be conducted at a temperature greater than or equal to 600° C., 700° C., 800° C., 900° C., or any other appropriate temperature. Similarly, sintering may be conducted at a temperature that is less than or equal to 1000° C., 900° C., 800° C., or any other appropriate temperature. Combinations of the above are contemplated including, for example, a sintering temperature between or equal to 600° C. and 1000° C.

After formation of an electroactive compound, the compound may be ground or milled to form particles, for example, using ball milling. In some cases, the particles may be treated to coat the particles, for instance, with a carbon-containing coating, thereby forming a coated particle. A coated particle may have a core and coating surrounding at least a portion of the core. For instance, the core may comprise or consist essentially of a sodium transition metal oxide compound (or other compound) as described herein, partially or completely surrounded by a carbon-containing coating or other appropriate coating. In some embodiments, the core and the coating are formed at the same time. In other cases, the core is first formed, then the coating is applied to the core. For instance, as discussed below, the particles may be mixed with a carbon-containing organic or inorganic material (e.g., sucrose), and optionally ground or milled, for example, using ball milling, or planetary or high-energy ball milling.

In one set of embodiments, particles such as those described herein (coated or uncoated) may be formed into electrodes (e.g., a cathode) for use in an electrochemical device. For instance, the particles may be pressed, optionally with carbon, binders (e.g., polytetrafluoroethylene, polyvinylidenefluoride, etc.), fillers, hardeners, or the like to form a solid article useable as an electrode in such an electrochemical device. The electrode may have any suitable shape for use within such a device. In some cases, at least about 50 wt % of the electrode is formed from the particles including the electroactive compounds described herein, and in some cases, at least about 75 wt %, at least about 80 wt %, at least about 85 wt %, at least about 90 wt %, at least about 95 wt %, or at least about 99 wt % of the electrode is formed from the particles including the electroactive compounds described herein. In some embodiments, additional carbon may be present as part of the electrode, for example, carbon black or carbon powder may be present in about 5 wt %, about 10 wt %, about 15 wt %, or any other appropriate weight percent of the electrode. Other materials may also be present within the electrode, for instance, binders, fillers, hardeners, or the like, may make up about 5 wt %, about 10 wt %, about 15 wt %, or any other appropriate weight percent of the electrode, depending on the embodiment.

In some embodiments, an electroactive compound as discussed herein may be used within a rechargeable alkali metal battery such as a sodium metal battery as well as sodium ion batteries, for example, within or as an electrode. A rechargeable alkali metal battery, such as a sodium battery, typically has electrodes that exchange sodium during charge and discharge. The rate at which the alkali metal ions can be exchanged is important in many applications where high charge and/or discharge rates are required for the battery. For a cathode material, alkali metal ions (such as sodium) and electrons are adsorbed during the discharge of the battery, and this process is reversed during charge. In addition to use in batteries, the current electroactive compounds may also be used in other electrochemical devices including, but not limited to, capacitors and super capacitors.

Several non-limiting examples regarding various electroactive compounds made according to the current disclosure are discussed further below.

Example: Experimental Procedures

When forming the various electroactive compounds detailed in the examples, stoichiometric amounts of the appropriate precursors needed to form the desired compound were measured out. The precursors used to form the compounds included $Na_2CO_3$, $Mn_2O_3$, $Fe_2O_3$, $Co_3O_4$, and NiO powders. After measuring out the precursors, the precursors were mixed and pressed into a pellet. The compounds were then synthesized by sintering the pellet at 900° C. in an oxygen gas flow for 12 hours. The pellet was quenched to room temperature and transferred immediately into an Ar-filled glovebox. An X-ray diffraction (XRD) sample was sealed with Kapton film inside the glovebox and then scanned from 10° to 85° 2θ angle on a PANalytical X'pert PRO diffractometer equipped with a Cu Kα radiation source. Structure analysis using the Rietveld method was carried out using Highscore Plus.

X-ray absorption spectroscopy (XAS) was also conducted. For example, for MFCN, XAS spectra were collected at the Mn, Fe, Co and Ni K-edge in transmission mode at beamline X18A of the National Synchrotron Light Source (NSLS) at Brookhaven National Laboratory. The monochromator was detuned to 30%-40% of its original intensity to eliminate the high order harmonics. Energy calibration was carried out using the first inflection point of the reference spectrum of Mn, Fe, Co and Ni-metallic foils which was simultaneously collected during each measurement. The X-ray absorption near edge structure (XANES) and extended X-ray absorption fine structure (EXAFS) spectra were processed using the Athena and Artemis software package. The AUTOBK code was used to normalize the absorption coefficient, and separate the EXAFS signal, $\chi(k)$, from the isolated atom-absorption background. The extracted EXAFS signal, $\chi(k)$, was weighted by $k^3$ to emphasize the high-energy oscillations and then Fourier-transformed in a k range from 3.2 to 10.8 $Å^{-1}$ using a Hanning window with a window sill ($\Delta k$) of 1.0 $Å^{-1}$, thereby obtaining magnitude plots of the EXAFS spectra in R-space (Å). The least-squares fits were carried out in R-space.

The cathode films used for electrochemical testing were made by mixing the electroactive compound powder, carbon black and PTFE with a weight ratio of 80:15:5 respectively. A Swagelok battery was assembled using a glass fiber separator, Na metal as the anode, and 1M $NaPF_6$ in EC:DEC as the electrolyte. The galvanostatic cycling was conducted on a Solartron 1470E at a rate of C/10 and a voltage range between about 1.9 V and 4.3 V.

In-situ lab XRD spectra were also taken using a Bruker D8 X-ray diffractometer equipped with a Mo source from a homemade in-situ electrochemical cell with a Be window. The in-situ cell was charged galvanostatically at a rate of C/50 between a voltage range of 2.0 V to 4.5 V on a Solartron 1287 with each XRD spectrum scanned from 6.5° to 30.5° 2θ (equivalent to 14.1° to 69.7° on Cu source) for 1 hour, corresponding to 2% Na composition resolution per spectrum. The phases in the in-situ XRD spectra were identified by Rietveld refinement.

Example: $Na(Mn_{0.25}Fe_{0.25}Co_{0.25}Ni_{0.25})O_2$

An O3 structured compound with composition $Na(Mn_{0.25}Fe_{0.25}Co_{0.25}Ni_{0.25})O_2$ (MFCN) was manufactured. The compound has a theoretical capacity of 239 mAh/g and an initial discharge capacity of 180 mAh/g over an average discharge voltage of 3.21 V giving a specific energy density of 578 Wh/kg. Moreover, cycling performance of MFCN is significantly improved over $Na(Ni_{0.5}Mn_{0.5})O_2$ and $Na(Fe_{0.5}Co_{0.5})O_2$ even when cycled with a higher voltage cutoff indicating a difference in the intrinsic properties of these compounds. As detailed below, in-situ lab X-ray diffraction (XRD) was performed to reveal the structure evolution of MFCN in the first electrochemical cycle exhibits reversible phase transitions between O3-P3-O3'-O3" phases and the absence of monoclinic distortions which shows a reversible transformation.

Example: MFCN Crystallography Characterization

Figure 2:
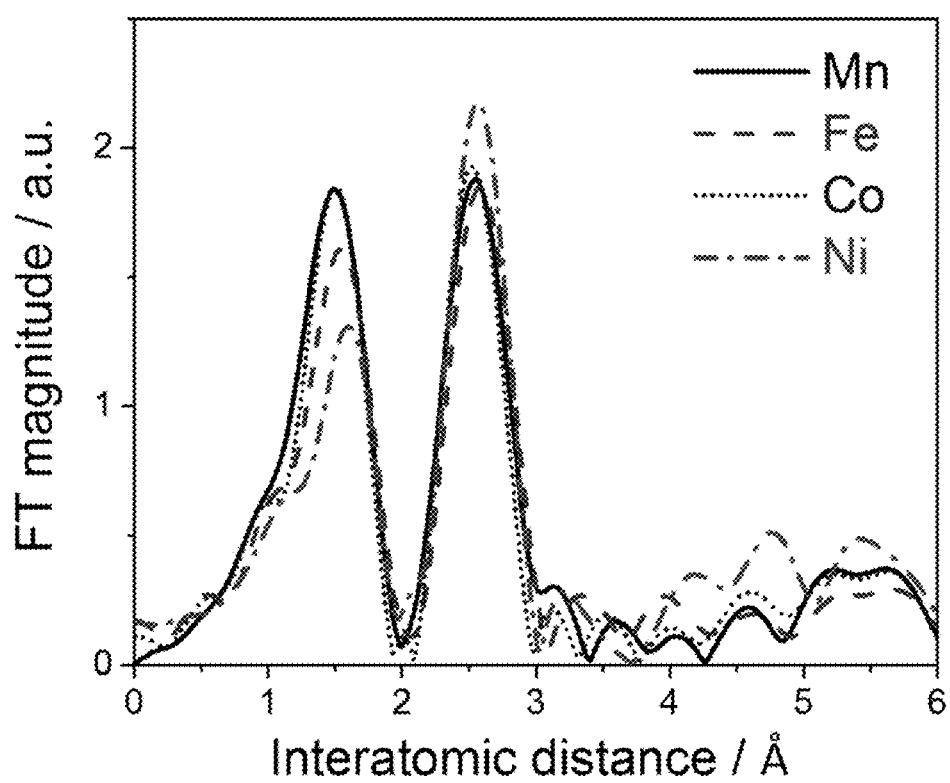
FIG. 2 is a graph of Fourier transformed (FT) Extended X-Ray Absorption Fine Structure (EXAFS) spectra at the Mn, Fe, Co, and Ni K-edges of pristine Na(Mn$_{0.25}$Fe$_{0.25}$Co$_{0.25}$Ni$_{0.25}$)O$_2$.

FIG. 1 shows that the XRD refinement is fit well by using R-3m symmetry and assuming a random mix of the TM ions for the O3-MFCN phase without any impurity peaks. The refined structural parameters are a=2.954 Å, c=15.913 Å, and z=0.233 Å. The electron diffraction pattern shown in FIG. 1 was taken perpendicular to the ab plane of pristine MFCN, and shows no superstructure reflection, indicating no long range ordering for transition metal (TM) ions. FIG. 2 presents Fourier transformed (FT) EXAFS spectra on the Mn, Fe, Co, Ni K-edges of pristine MFCN with the least-square fitting results shown in Table 1. The interatomic distances from XRD refinement for TM-O, TM-TM and TM-Na ions are 2.009 Å, 2.954 Å and 3.153 Å, respectively, consistent with the values of 1.985 Å, 2.941 Å and 3.147 Å averaged from the bond lengths listed in Table 1. These results are consistent with a solid solution of the four transition metal ions mixed in the transition metal layer of MFCN.

TABLE 1

| TM in MFCN | Path | r/Å | $\sigma^2/10^{-3}$ Å$^2$ | ΔE/eV | R |
|---|---|---|---|---|---|
| Mn | Mn—O | 1.92(8) ± 0.077 | 3.56 ± 1.72 | −0.70 ± 2.53 | 0.003 |
|  | Mn—TM | 2.94(7) ± 0.005 | 2.95 ± 1.03 |  |  |
|  | Mn—Na | 3.03(1) ± 0.122 | 17.65 ± 11.48 |  |  |
| Fe | Fe—O | 2.01(1) ± 0.006 | 6.10 ± 10.70 | 0.12 ± 1.62 | 0.001 |
|  | Fe—TM | 2.94(9) ± 0.004 | 3.89 ± 6.59 |  |  |
|  | Fe—Na | 3.21(1) ± 0.059 | 58.65 ± 42.42 |  |  |
| Co | Co—O | 1.94(5) ± 0.010 | 4.18 ± 1.36 | 0.47 ± 1.97 | 0.002 |
|  | Co—TM | 2.91(8) ± 0.009 | 4.62 ± 0.87 |  |  |
|  | Co—Na | 3.03(3) ± 0.046 | 40.30 ± 24.19 |  |  |
| Ni | Ni—O | 2.05(4) ± 0.007 | 6.81 ± 1.23 | −1.56 ± 0.88 | 0.001 |
|  | Ni—TM | 2.94(9) ± 0.005 | 4.11 ± 0.70 |  |  |
|  | Ni—Na | 3.31(4) ± 0.036 | 13.24 ± 5.65 |  |  | r: bond length; $\sigma^2$: Debye-Waller factor (disorder); ΔE: inner shell potential shift; R: R-factor.

Figure 3:
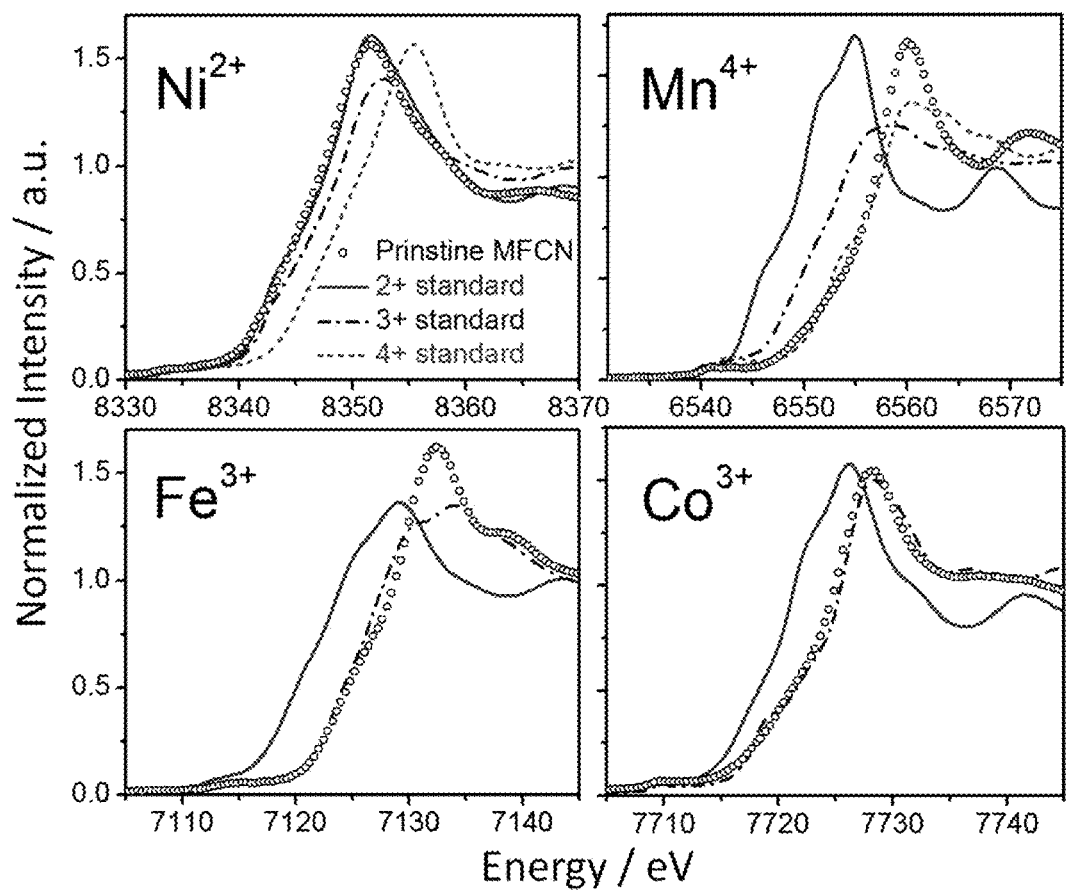
FIG. 3 presents a graph of X-ray absorption near edge structure (XANES) spectra at the Mn, Fe, Co, and Ni K-edges of pristine Na(Mn$_{0.25}$Fe$_{0.25}$Co$_{0.25}$Ni$_{0.25}$)O$_2$ and different transition metal oxides samples with standard valence states, including MnO (Mn$^{2+}$), Mn$_2$O$_3$ (Mn$^{3+}$), MnO$_2$ (Mn$^{4+}$), FeO (Fe$^{2+}$), Fe$_2$O$_3$ (Fe$^{3+}$), CoO (Co$^{2+}$), LiCoO$_2$ (Co$^{3+}$), LiNi$_{1/3}$Co$_{1/3}$Mn$_{1/3}$O2 (Ni$^{2+}$), LiNiO$_2$ (Ni$^{3+}$), Li$_{0.0}$Ni$_{1/3}$Co$_{1/3}$Mn$_{1/3}$O2 (Ni$^{4+}$)

XANES results for MFCN are depicted in FIG. 3 which show the valence states of Mn, Fe, Co, Ni in pristine MFCN as 4+, 3+, 3+, 2+, respectively, by comparing the edge positions with standard samples of transition metal oxides. The TM-O bond lengths of different TM ions in Table 1 also agree well with the ion radii of the TM ions with the valence states determined by XANES. The measured valence states of the four transition metal ions in MFCN are the same as the ones in the NM and FC systems. However, both the electrochemical performance and the structural evolution of MFCN show significant differences from the performance expected from a simple combination of the two binary sodium transition metal oxide systems. This indicates that MFCN is not a simple combination of NM and FC.

Example: MFCN Charge/Discharge Characterization

Figure 4:
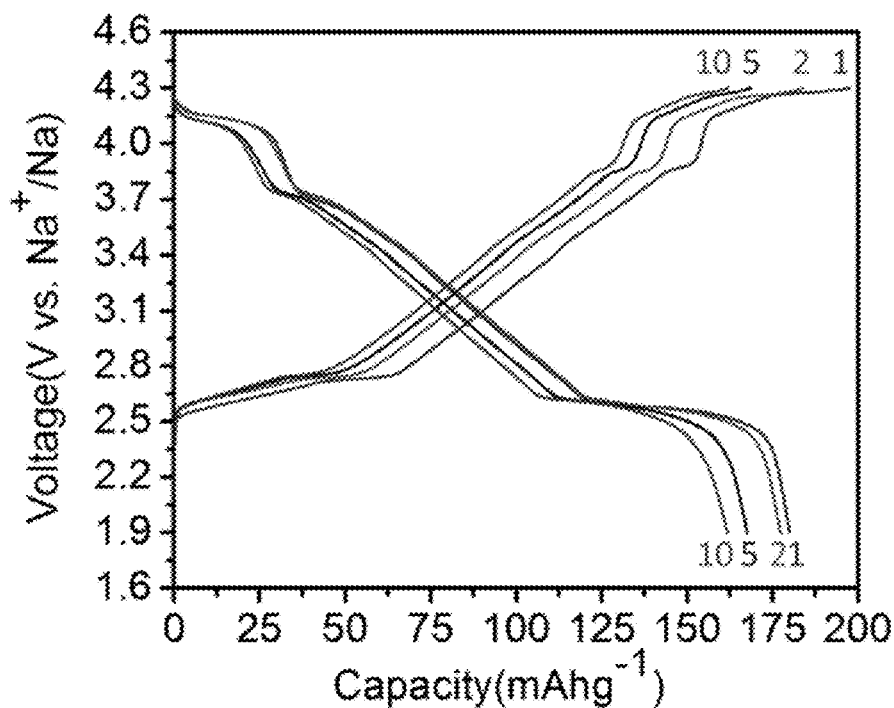
FIG. 4 is a graph of galvanostatic charge and discharge profiles at 1$^{st}$, 2$^{nd}$, 5$^{th}$ and 10$^{th}$ cycles for Na(Mn$_{0.25}$Fe$_{0.25}$Co$_{0.25}$Ni$_{0.25}$)O$_2$.

FIG. 4 shows the galvanostatic charge and discharge profiles of MFCN between over a voltage range between about 1.9V and 4.3V at a charge discharge rate of C/10. The initial discharge capacity of MFCN is 180 mAh/g and occurs over an average discharge voltage of 3.21 V which corresponds to a specific energy density about 578 Wh/kg.

Figure 5:
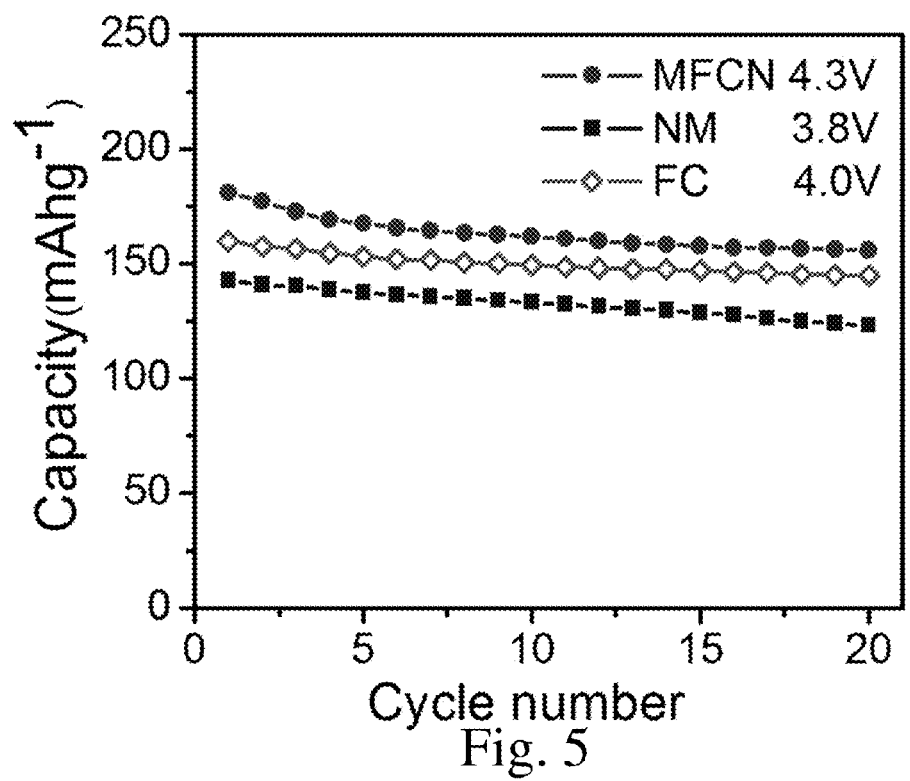
FIG. 5 is a graph of discharge capacity of Na(Mn$_{0.25}$Fe$_{0.25}$Co$_{0.25}$Ni$_{0.25}$)O$_2$ cycled between 1.9 V and 4.3 V at different cycles compared with Na(Mn$_{0.5}$Ni$_{0.5}$)O$_2$ cycled between 1.9V and 3.8 V and Na(Fe$_{0.5}$Co$_{0.5}$)O$_2$ cycled between 1.9 V and 4.0 V at a C/10 rate.
Figure 6:
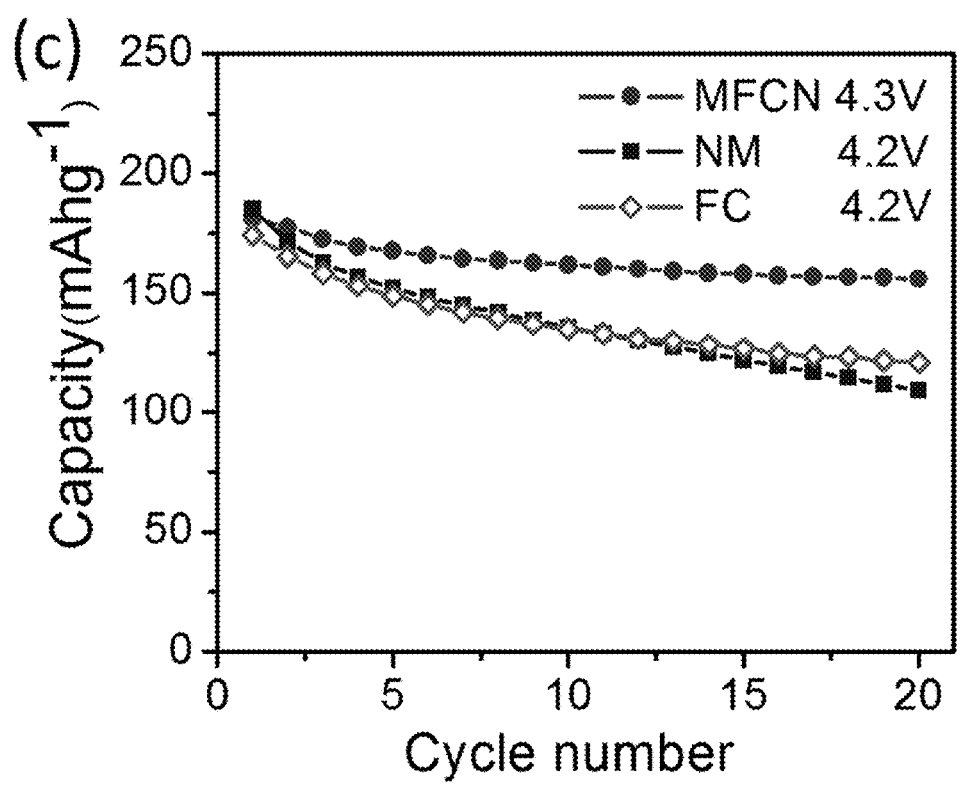
FIG. 6 is a graph of initial discharge capacity of Na(Mn$_{0.25}$Fe$_{0.25}$Co$_{0.25}$Ni$_{0.25}$)O$_2$ cycled between 1.9 V and 4.3 V at different cycles compared with Na(Mn$_{0.5}$Ni$_{0.5}$)O$_2$ and Na(Fe$_{0.5}$Co$_{0.5}$)O$_2$ cycled between 1.9 V and 4.2 V at a C/10 rate.

FIG. 5 shows the cycling performance of MFCN over a voltage range of about 1.9 V to 4.3 V as compared with NM cycled between 1.9 V and 3.8 V and FC cycled between 1.9 V and 4.0 V, all at a charge/discharge rate of about C/10. As shown by the figure, MFCN shows a higher initial discharge capacity with comparable cyclability as NM and FC even though it is cycled over a higher voltage rage. FIG. 6 shows the same cyclability test result of MFCN compared with NM and FC cycled between 1.9 V and 4.2 V, all at a C/10 charge/discharge rate. Both NM and FC show much more significant capacity fading compared with MFCN over these voltage ranges. Without wishing to be bound by theory, it has been speculated that the capacity fading of NM and FC cycled above 4.0 V is due to electrolyte decomposition. However, the improved cycling performance of MFCN over NM and FC in the same type of electrolyte and high cutoff voltage range suggests that the different cycling performance between these compounds may also has be due to the intrinsic properties of the materials themselves.

Example: MFCN Structural Evolution During Charge and Discharge

Figure 7:
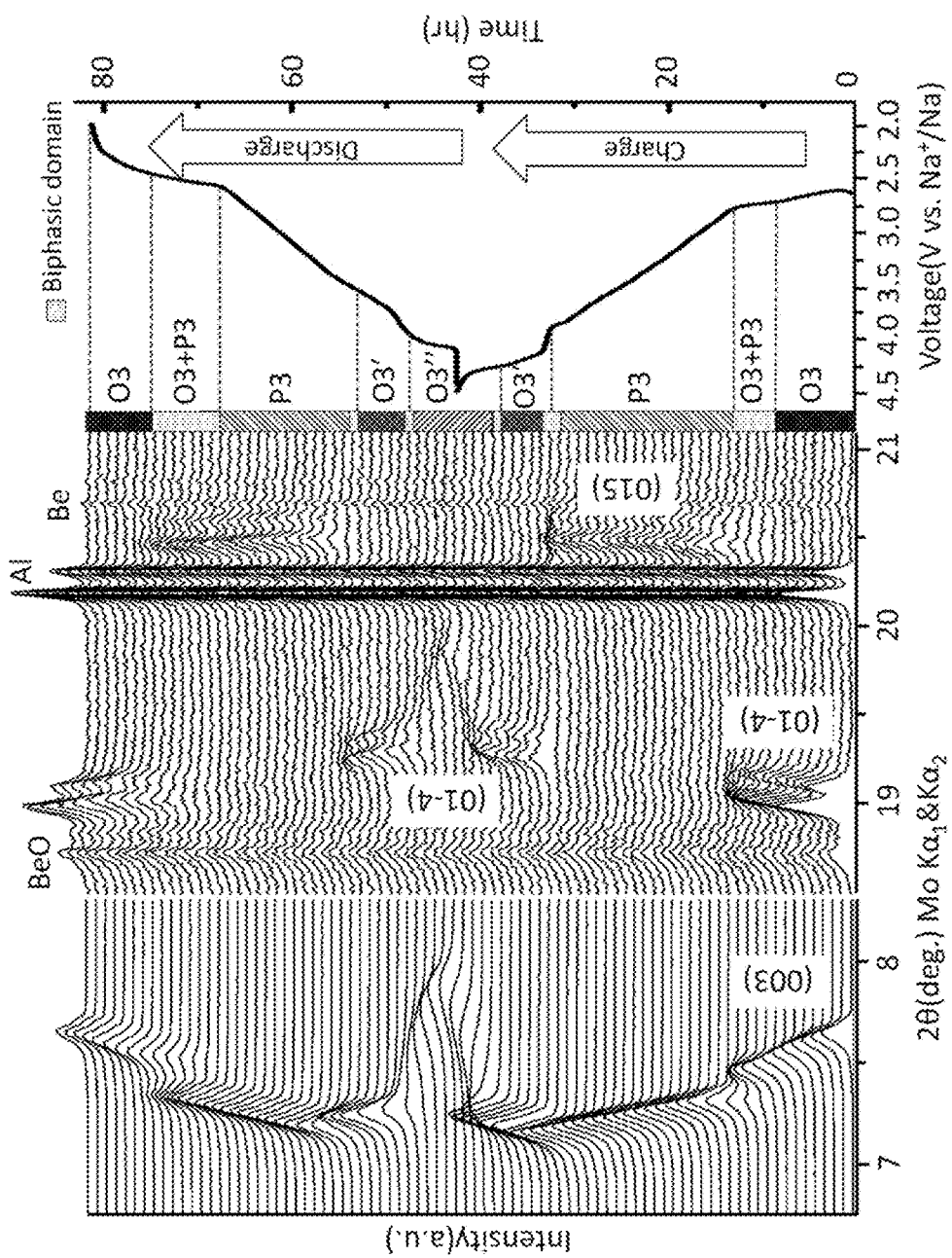
FIG. 7 is a graph of in-situ x-ray diffraction results taken at a 1 hour scanning rate per spectrum showing the characteristic hkl peak evolution in different phases corresponding to the in-situ galvanostatic charge and discharge profile at a C/50 rate of Na(Mn$_{0.25}$Fe$_{0.25}$Co$_{0.25}$Ni$_{0.25}$)O$_2$.
Figure 8:
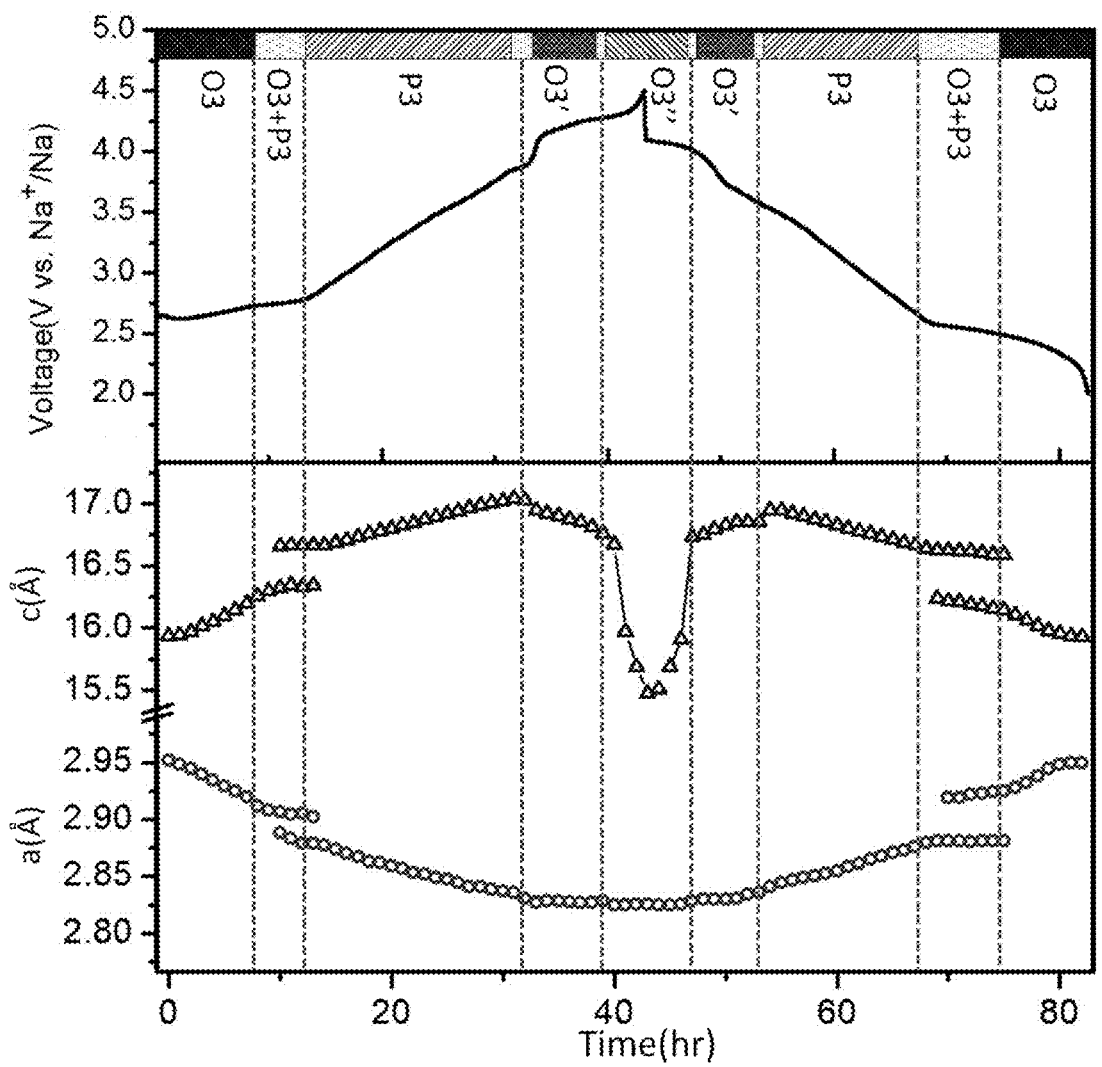
FIG. 8 is a graph of lattice parameters calculated from in-situ XRD measurements compared with the in-situ galvanostatic charge and discharge profiles of Na(Mn$_{0.25}$Fe$_{0.25}$Co$_{0.25}$Ni$_{0.25}$)O$_2$.

FIG. 7 shows the characteristic hkl peak evolution of multiple phases in MFCN during the first galvanostatic cycle between about 2.0 V and 4.5 V together with the in-situ charge and discharge profile. The lattice parameter evolution calculated from the in-situ XRD measurement is shown in FIG. 8. The (003) peaks of the O3 phase shift to lower angle and the (01-4) peaks to higher angle upon Na de-intercalation, corresponding to the typical expansion of the interplanar distance and decrease of the intra-planar distance. Two-phase coexistence of O3 and P3 occurs for 20~26% Na de-intercalation, followed by the transition to the P3 phase beyond 26% Na de-intercalation. The transition is characterized by the significant intensity decrease of the (01-4) peak of O3 and the increase of the (015) peak of P3. At 66% Na de-intercalation the P3 phase transform to a new hexagonal O3 phase labeled as O3' associated with a shift of (003) peak back toward higher angle, corresponding to a decrease of the interplanar distance. Beyond 80% Na de-intercalation the (003) peaks experience large shift to high angle forming another new hexagonal O3 phase labelled as O3'' with significant peak broadening, corresponding to highly decreased average inter-slab distances even below the value of the fully sodiated state. Without wishing to be bound by theory, it is believed that stacking faults between the slabs cause the peak broadening. The phase transition processes are reversible upon discharge as shown in FIGS. 7 and 8.

One feature of the structural evolution of MFCN is that no monoclinic distortion was observed during Na de-intercalation. This is very different from the NM system where multiple phase transitions between hexagonal and monoclinic phases are observed. Monoclinic distortions usually arise from Na ordering, Jahn-Teller distortion of the TM ions, or the coupling between them. Again without wishing to be bound by theory, the absence of clear Na ordering in MFCN may be a result of Na site disorder caused by the perturbations of the TM disorder. The particular TM composition in MFCN also reduces the amount of active Jahn-Teller ions, with only 25% Ni in the TM layer as compared with 50% in the NM system. These factors may largely suppress any monoclinicity, giving a much smoother electrochemical profile for MFCN compared with the more stepwise-like profile in the NM system.

As noted above, FC shows excellent cycling performance when cycled below 4.0 V cutoff voltage, but the current results show that the cyclability drops significantly when the cutoff voltage is increased to 4.2 V, which may indicate some structural instability and irreversibility of FC at high voltage and/or very low Na composition. In contrast, the in-situ XRD of MFCN shows that the high voltage O3' and O3'' phases are reversible in the initial cycle, consistent with the reversible features observed in the first charge and discharge electrochemical profiles. However, the O3'' phase region of MFCN above 4.25 V is not fully reversible in the following cycles as observed in FIG. 7.

Example: Electroactive Compound Performance Comparisons

Additional sodium transition metal oxide electroactive compounds were manufactured and their performances evaluated. Table 2 below summarizes the compounds investigated as well as their initial discharge capacity and energy density.

TABLE 2

| Compound | $1^{st}$ discharge capacity (mAh/g) | Energy Density (Wh/kg) |
| --- | --- | --- |
| $Na(Mn_{1/4}Fe_{1/4}Co_{1/4}Ni_{1/4})O_2$ [MFCN] | 185 | 596 |
| $Na(Fe_{1/3}Co_{1/3}Ni_{1/3})O_2$ [FCN] | 180 | 545 |
| $Na(Mn_{1/3}Fe_{1/3}Co_{1/3})O_2$ [MFC] | 180 | 533 |
| $Na(Mn_{1/3}Fe_{1/3}Ni_{1/3})O_2$ [MFN] | 185 | 592 |
| $Na(Mn_{1/3}Co_{1/3}Ni_{1/3})O_2$ [NMC] | 175 | 557 |
| $Na(Mn_{1/2}Fe_{1/2})O_2$ [MF] | 153 | 424 |
| $Na(Co_{1/2}Ni_{1/2})O_2$ [NC] | 135 | 414 |
| $Na(Fe_{1/2}Ni_{1/2})O_2$ [FN] | 140 | 430 |
| $Na(Fe_{1/2}Co_{1/2})O_2$ [FC] | 159 | 498 |
| $Na(Mn_{1/2}Ni_{1/2})O_2$ [NM] | 183 | 596 |
| $Na(Fe_{1/3}Ni_{2/3})O_2$ | 195 | 620 |
| $NaMnO_2$ [Mn] | 191 | 533 |
| $NaNiO_2$ [Ni] | 147 | 454 |
| $NaCoO_2$ [Co] | 127 | 398 |
| $NaFeO_2$ [Fe] | 0 | 0 |

Figure 9A:
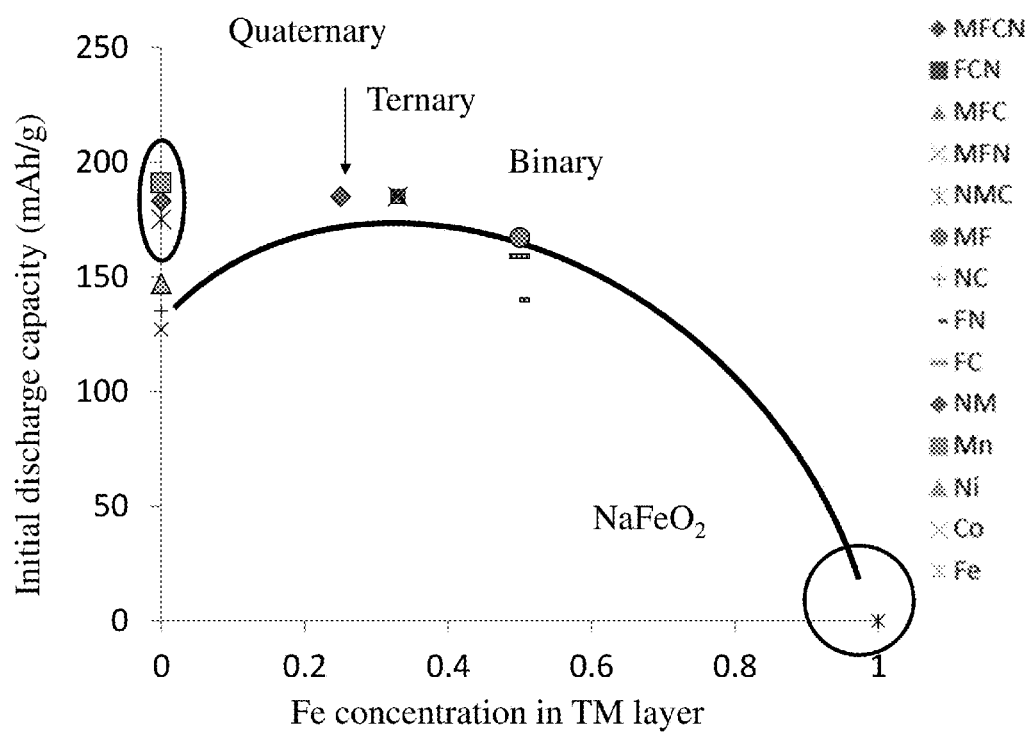
FIG. 9A is a graph of initial discharge capacity versus Fe concentration in the transition metal (TM) layer.
Figure 9B:
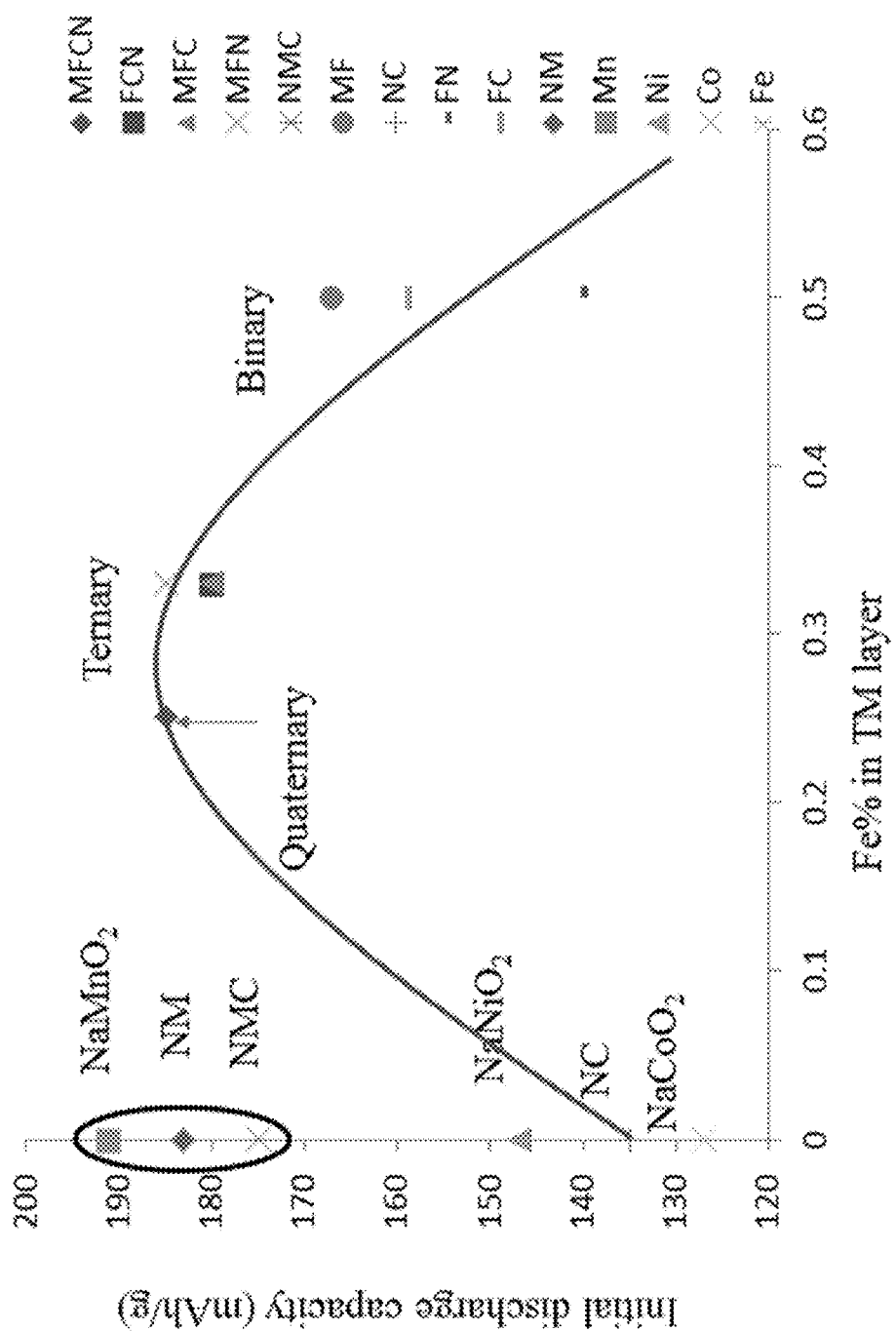
FIG. 9B is a graph of the portions of FIG. 9A extending up to 0.6 Fe in the TM layer.
Figure 10:
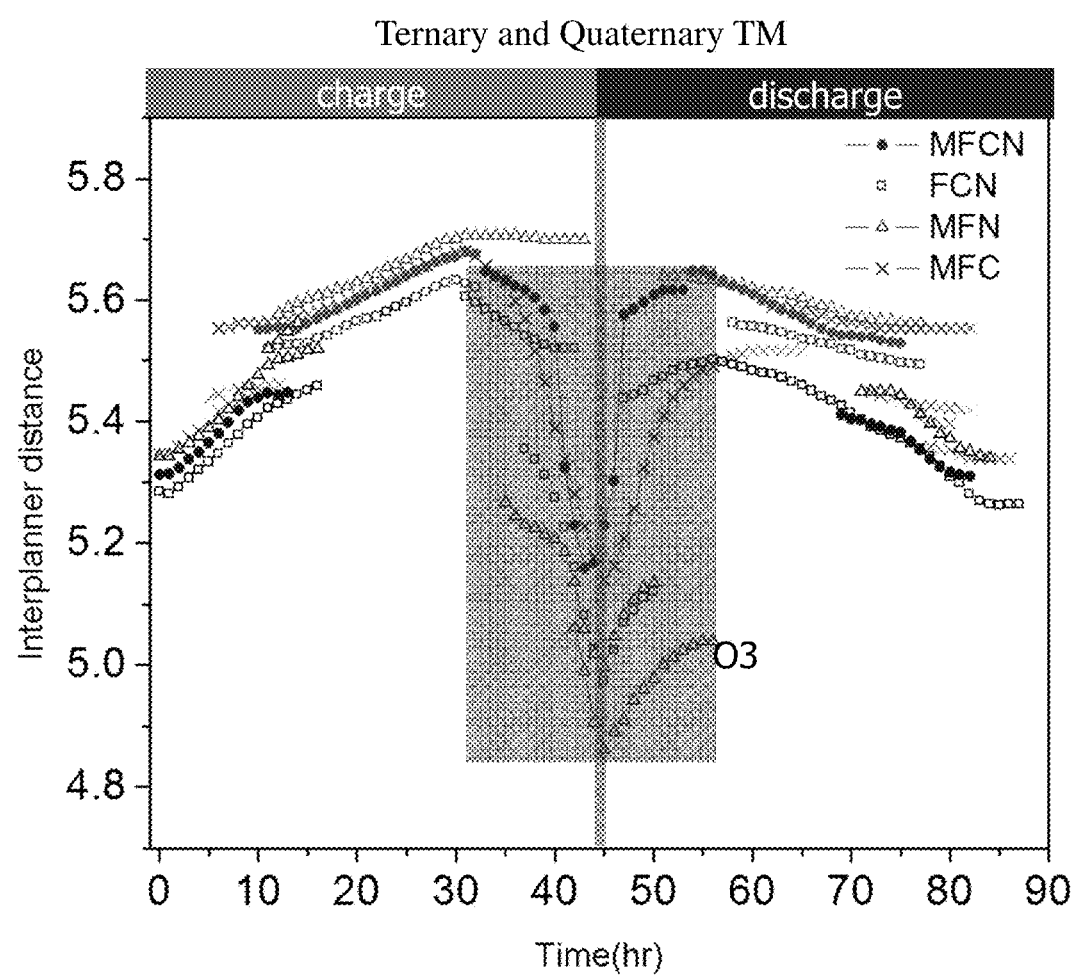
FIG. 10 is a graph of the interplanar distance of ternary and quaternary compounds in the O3 phase during charge and discharge.

The initial discharge capacities of the above compounds are plotted against Fe concentration in the transition metal layer in FIGS. 9A and 9B. $NaMnO_2$ as well as NM and NMC are shown as well for comparative purposes. As shown in the graphs, the presently disclosed electroactive compounds having ⅓ Fe in the transition metal layer tended to have higher initial discharge capacities on the order of those observed for $NaMnO_2$, NM, and NMC.

Example: Interplanar Distance Versus Charge

Figure 11:
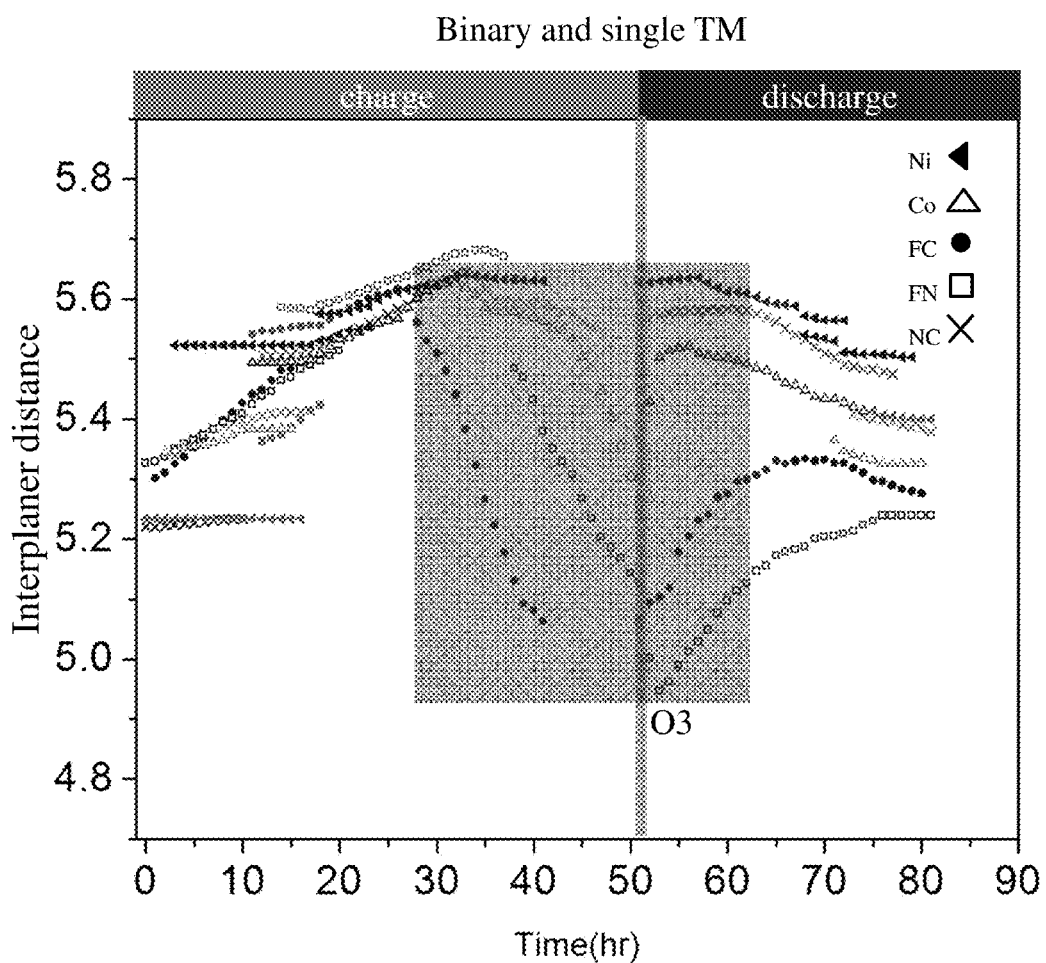
FIG. 11 is a graph of the interplanar distance of binary and singular compounds in the O3 phase during charge and discharge.
Figure 12:
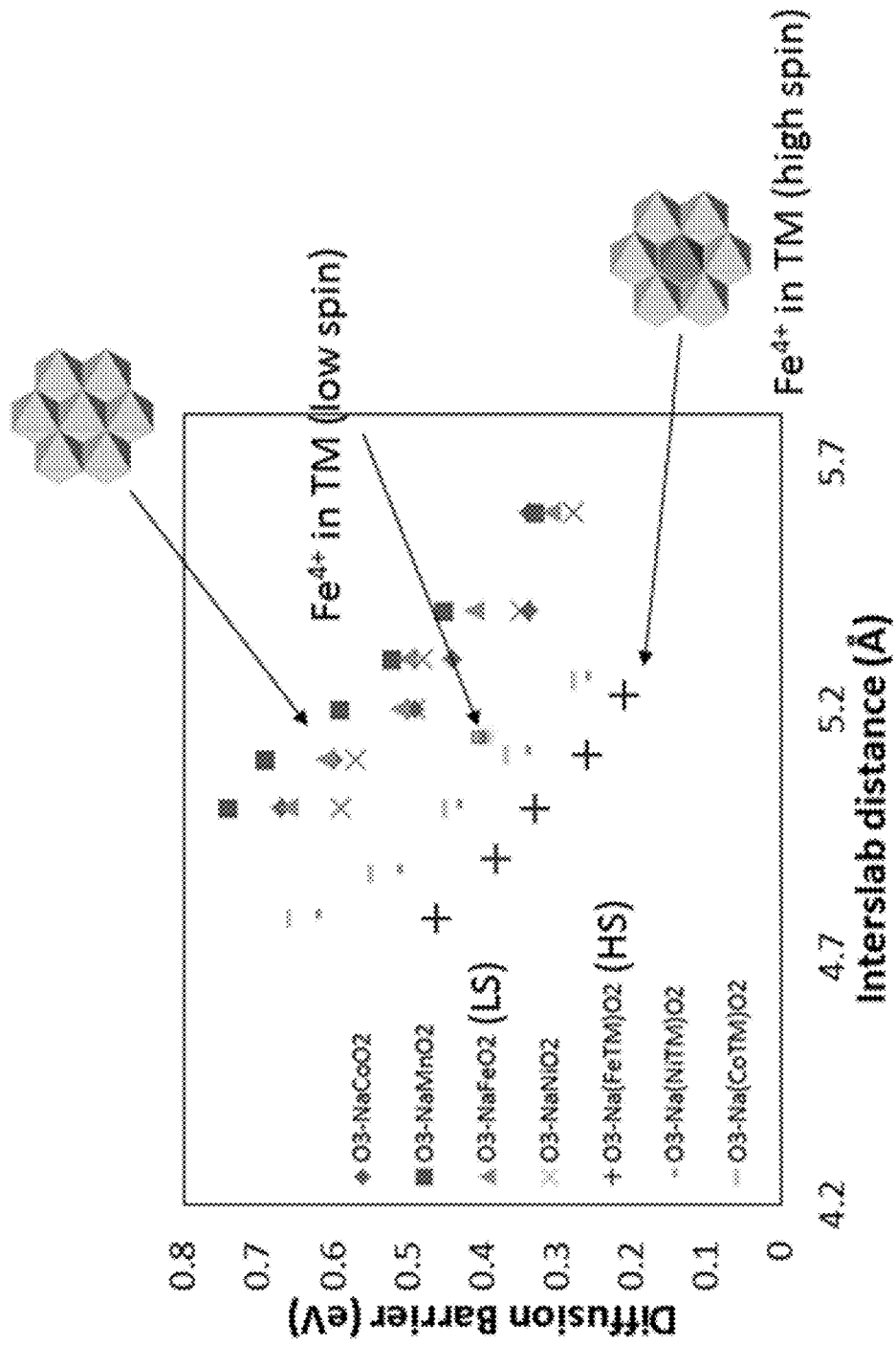
FIG. 12 is a graph of the calculated Na diffusion barrier for different compounds at various interplanar distances.

FIGS. 11 and 12 present the interplanar distance for various electroactive compounds during a charge discharge cycle. As shown in the figures, the O3 phase forms in all of the tested compounds at high voltages and exhibit interplanar distances that vary between 4.8 Å and 5.6 Å. This indicates that the lattice spacing of the crystal structure is decreasing during the end of charge which may inhibit the diffusion of sodium ions through the lattice. Without wishing to be bound by theory, the formation of $Fe^{4+}$, which is Jahn-Teller active, at the end of charge, as compared to the other investigated transition metals which are not Jahn-Teller active at the end of charge, permits the lattice to distort or buckle to accommodate sodium diffusion through the lattice even while the lattice spacing is decreasing. However, as noted below, if too much Fe is present in the compound, the Fe will begin to form Fe clusters lowering the Fe migration barrier which may interfere with the sodium ion diffusion mechanism noted above.

Example: Density Functional Theory Studies of Iron Concentration

Density functional theory was used to evaluate the effect of Fe concentration on the diffusion barrier of Na.

Figure 13:
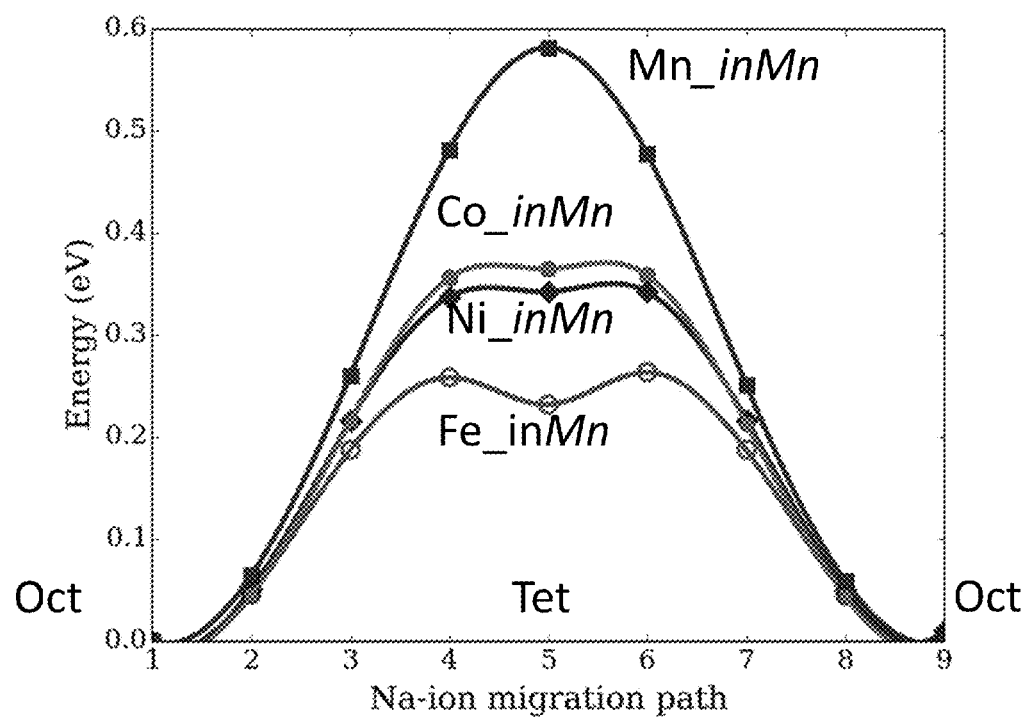
FIG. 13 is a graph of the calculated Na diffusion barrier energy for different transition metals in a manganese containing compound.

FIG. 12 is a graph of the calculated sodium diffusion barrier for different compounds versus the change in inter-slab/interplanar distance observed during a charging cycle. As can be seen in the graph, the Na diffusion barrier is too high for Na intercalation in a single transition metal layered compound in the high voltage O3 phase. However, as noted previously embedding a first transition metal (TM) in a surrounding TM environment comprising a second different TM could lower the Na diffusion barrier. For example, high spin $Fe^{4+}$ embedded in other types of TM gives the lowest observed Na diffusion barrier in the studied combinations, see FIG. 13. In contrast, the sodium diffusion energy barrier in the low spin $Fe^{4+}$ case is significantly higher. Without wishing to be bound by theory, it is believed that the high spin $Fe^{4+}$ is Jahn-Teller active and imparts flexibility to the crystal lattice which allows the lattice to deform and buckle up when Na ions pass through the tetrahedral site, thus, lowering the Na diffusion barrier.

Calculations were also conducted to determine the migration energy of Fe from the octahedral to the tetrahedral site within the crystal lattice. When around ⅓ of the transition metal is Fe, the Fe atoms begin to touch each other to from Fe clusters which may result in Fe migration due to the "dynamic $Na_{tet}$—$Fe_{tet}$ dumbbell" mechanism for Fe migration. Therefore, energies were calculated for cases of isolated Fe atoms, clusters of two Fe atoms, and clusters of three Fe atoms (in two different possible configurations). The calculations were performed both with the and without the dynamic dumbbell of the energy difference of Na versus Fe in the tetrahedral site. The calculated energy barriers are summarized below in Table 3.

TABLE 3

Energy difference of $TM_{tet}$—$TM_{oct}$

| | Isolated Fe | Cluster of 2 Fe atoms | Cluster of 3 Fe atoms |
|---|---|---|---|
| With $Na_{tet}$—$TM_{tet}$ dumbbell | 0.757 eV | 0.322 eV | 0.245 eV (−0.4 eV) |
| W/o $Na_{tet}$—$TM_{tet}$ dumbbell | 1.814 eV | 1.202 eV | 1.052 eV |

As illustrated in the table above, the Natet-TMtet dumbbell lowers the migration energy of Fe to the tetrahedral site, compared with the non-dumbbell case. Additionally, the presence of the positive values in the table suggests the "dynamic dumbbell" is associated with Na diffusion, as compared to the static dumbbell case observed in the Li layered structure with negative dumbbell energies. It is noted that only the isolated Fe case (0.757 eV) could survive and does not migrate. The isolated Fe case corresponds to around ⅓ Fe in the TM layer. If the concentration of Fe in the TM layer is greater than about ⅓, Na assisted Fe migration with the dynamic dumbbell will stimulate Fe migration during de-intercalation of the Na resulting in an increased Na diffusion barrier.

Based on the above, $Fe^{4+}$ was the only Jahn-Teller active TM in its oxidized state at the end of charge. Further, ⅓ Fe in the TM layer in its oxidized $Fe^{4+}$ state provided enhanced structural flexibility through Jahn-Teller distortion to lower the energy difference between $Fe_{oct}$ and $Fe_{tet}$ structures resulting in a decreased sodium diffusion barrier. However, transient Na tetrahedral occupation during Na diffusion led to a further lowering of the energy difference between $Fe_{tet}$ and $Fe_{oct}$ inducing Fe migration for concentrations greater than ⅓ in the TM layer. Therefore, it may be desirable to maintain the Fe composition in a compound to be less than or equal to ⅓ of the TM layer to prevent Fe migration. It is noted though that Fe concentrations greater than ⅓ of the TM content of the compound are also contemplated.

While several embodiments have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present disclosure. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the disclosure may be practiced otherwise than as specifically described and claimed. The present disclosure is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An electroactive compound comprising:
   $Na(Fe_aX_{1-a})O_2$, wherein X includes at least Co, wherein a is greater than 0 and less than or equal to 0.25, and wherein the compound exhibits a hexagonal O3 layered intercalated structure.

2. The electroactive compound of claim 1, wherein a is greater than or equal to 0.2.

3. The electroactive compound of claim 2, wherein X includes equal portions of Mn, Co, and Ni.

4. The electroactive compound of claim 3, wherein X includes equal portions of Mn, Co, and Ni.

5. The electroactive compound of claim 1, wherein an initial discharge capacity of the electroactive compound is greater than or equal to 170 mAh/g and less than or equal to 200 mAh/g.

6. The electroactive compound of claim 1, wherein a specific energy density of the electroactive compound is greater than or equal to 500 Wh/kg and less than or equal to 650 Wh/kg.

7. An electroactive compound comprising:
   $Na(Mn_wFe_xCo_yNi_z)O_2$, wherein w, x, y, and z are each greater than 0, wherein a sum of w, x, y, and z is equal to 1, wherein x is greater than 0 and less than $\frac{1}{3}$, and wherein the compound exhibits a hexagonal $O_3$ layered intercalated structure.

8. The electroactive compound of claim 7, wherein x is greater than or equal to 0.1 and less than or equal to $\frac{1}{3}$.

9. The electroactive compound of claim 8, wherein x is greater than or equal to 0.2 and less than or equal to $\frac{1}{3}$.

10. The electroactive compound of claim 7, wherein w, y, and z are each between or equal to 0.1 and 0.5.

11. The electroactive compound of claim 7, wherein an initial discharge capacity of the electroactive compound is greater than or equal to 170 mAh/g and less than or equal to 200 mAh/g.

12. The electroactive compound of claim 7, wherein a specific energy density of the electroactive compound is greater than or equal to 500 Wh/kg and less than or equal to 650 Wh/kg.

13. The composition of claim 7, wherein x is less than or equal to 0.25.

14. A composition, comprising $Na(Mn_{1/4}Fe_{1/4}Co_{1/4}Ni_{1/4})O_2$, wherein the compound exhibits a hexagonal 03 layered intercalated structure.

15. A composition, formed by mixing stoichiometric amounts of $Mn_2O_3$, $Fe_2O_3$, $CO_3O_4$, NiO, and $NaCoO_3$, wherein the composition exhibits a hexagonal 03 layered intercalated structure, wherein the composition comprises Co, and wherein Fe makes up greater than 0 and less than $\frac{1}{3}$ of a transition metal content of the composition.

16. The composition of claim 15, wherein Fe makes up less than or equal to $\frac{1}{4}$ of the transition metal content of the composition.

* * * * *